US008642875B2

(12) United States Patent
Kinter

(10) Patent No.: US 8,642,875 B2
(45) Date of Patent: Feb. 4, 2014

(54) MIDI RE-MAPPING PROCESS FOR UTILIZING PROPER MUSIC THEORY WHEN PLAYING A KEYBOARD

(71) Applicant: Zachary Charles Kinter, Sacramento, CA (US)

(72) Inventor: Zachary Charles Kinter, Sacramento, CA (US)

( * ) Notice: Subject to any disclaimer, the term of this patent is extended or adjusted under 35 U.S.C. 154(b) by 0 days.

(21) Appl. No.: 13/951,360

(22) Filed: Jul. 25, 2013

(65) Prior Publication Data

US 2013/0305906 A1 Nov. 21, 2013

Related U.S. Application Data

(60) Provisional application No. 61/678,442, filed on Aug. 1, 2012.

(51) Int. Cl.
*G10H 7/00* (2006.01)
*H02M 5/00* (2006.01)

(52) U.S. Cl.
USPC .................................................. 84/619; 84/637

(58) Field of Classification Search
USPC ............................ 84/613, 637, 645, 619, 657
See application file for complete search history.

(56) References Cited

U.S. PATENT DOCUMENTS

| | | | | | |
|---|---|---|---|---|---|
| 5,501,130 | A * | 3/1996 | Gannon et al. | .................. | 84/454 |
| 5,841,053 | A * | 11/1998 | Johnson et al. | ................. | 84/615 |
| 6,057,503 | A * | 5/2000 | Shinsky | .......................... | 84/657 |
| 6,156,966 | A * | 12/2000 | Shinsky | .......................... | 84/657 |
| 6,448,486 | B1 * | 9/2002 | Shinsky | .......................... | 84/613 |
| 7,208,670 | B2 * | 4/2007 | Sim et al. | ........................ | 84/609 |

* cited by examiner

*Primary Examiner* — Jeffrey Donels
(74) *Attorney, Agent, or Firm* — Plager Schack, LLP

(57) ABSTRACT

A process and a system are disclosed for some embodiments of the invention that map MIDI signals in a manner which always puts the harmony and melody octaves of an electronic MIDI keyboard in perfect pitch for a user of the keyboard. The process of some embodiments includes (i) receiving a selection of a key signature, (ii) receiving a selection of a scale, (iii) organizing the left side octave(s) ("chord" side) into a chord generator that places all scale tones on white keys and applies a chord effect to each white key, relative to the scale tone position, and (iv) organizing the right side octave(s) ("melody" side) into a melody lock that provides multiple settings for mapping the seven scale tones onto white keys.

10 Claims, 4 Drawing Sheets

MIDI RE-MAPPING PROCESS FOR UTILIZING PROPER MUSIC THEORY WHEN PLAYING A KEYBOARD

CLAIM OF BENEFIT TO PRIOR APPLICATION

This application claims benefit to U.S. Provisional Patent Application 61/678,442, entitled "AUTOtheory—MIDI chord generator process for digital audio workstations (software plug in) and keyboard instruments," filed Aug. 1, 2012. The U.S. Provisional Patent Application 61/678,442 is incorporated herein by reference.

BACKGROUND

The embodiments herein relate generally to mapping MIDI signals (or any other form of digital/electronic music communication system), and more particularly to mapping MIDI signals in a manner that puts harmony and melody octaves of a MIDI instrument in perfect pitch.

Many modern music producers have no formal education in music theory and only limited or no formal training in applying music theory to the playing of music instruments used to create music productions. Keyboard instruments, such as electronic keyboards, electronic pianos, and synthesizers, provide music producers a wide range of capabilities for producing a music project. However, without an understanding of music theory and its specific application to, for example, an electronic keyboard, the music producer would be largely limited to using only a small range of the musical capabilities the keyboard has to offer. For example, a chord progression with a particular melody is often the basis of a music composition, yet it is exceptionally difficult for a producer with no music theory training to play such a chord progression and a corresponding melody in perfect tune. Thus, music producers have needed ways to overcome limited or no music theory training in order to leverage the full musical capacity of keyboard instruments.

As a result, many producers have resorted to using samples as a primary element to the music they produce. Samples are short audio clips extracted from other music productions. A music producer can, for instance, record and use a short audio clip of an electric guitar riff performed by another musician and recorded on another music production. However, this has led to many legal problems, and has limited producers' creativity on a certain level. Recently a few software programs (e.g., VST plug-ins) have been created which provide a producer with the ability to easily compose chord progressions without a background in music theory. However, the offerings that these software programs provide are limited. Indeed, the chord progressions that are possible by using these programs are all limited, and thus, a music producer's artistic expression is constrained from the start when using these programs. Also, none of the current software programs allow for users to edit the intonation and voicing of each individual tone within each chord. In addition, most products do not enable the producer to create melodies along with the chords that are automatically generated. Those that do enable simultaneous melodic composition force the user to slide their right hand up and down the scale from root key to root key. Because such programs tend to limit artistic expression, the music producer typically ends up compromising the aesthetic quality of the work. This remains a problem for those music producers who lack the formal music theory education and training needed to fully express the artistic vision he or she has for a music production.

Therefore, what is needed is a way for music producers without formal music theory training to leverage the full unconstrained musical capacity of a piano or keyboard.

BRIEF SUMMARY

A process and a system are disclosed for some embodiments of the invention that map MIDI signals in a manner which always puts the harmony and melody octaves of an electronic MIDI keyboard in perfect pitch for a user of the keyboard. The process of some embodiments includes (i) receiving a selection of a key signature, (ii) receiving a selection of a scale, (iii) organizing the left side octave(s) ("chord" side) into a chord generator that places all scale tones on white keys and applies a chord effect to each white key, relative to the scale tone position, and (iv) organizing the right side octave(s) ("melody" side) into a melody lock that provides multiple settings for mapping the seven scale tones onto white keys.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
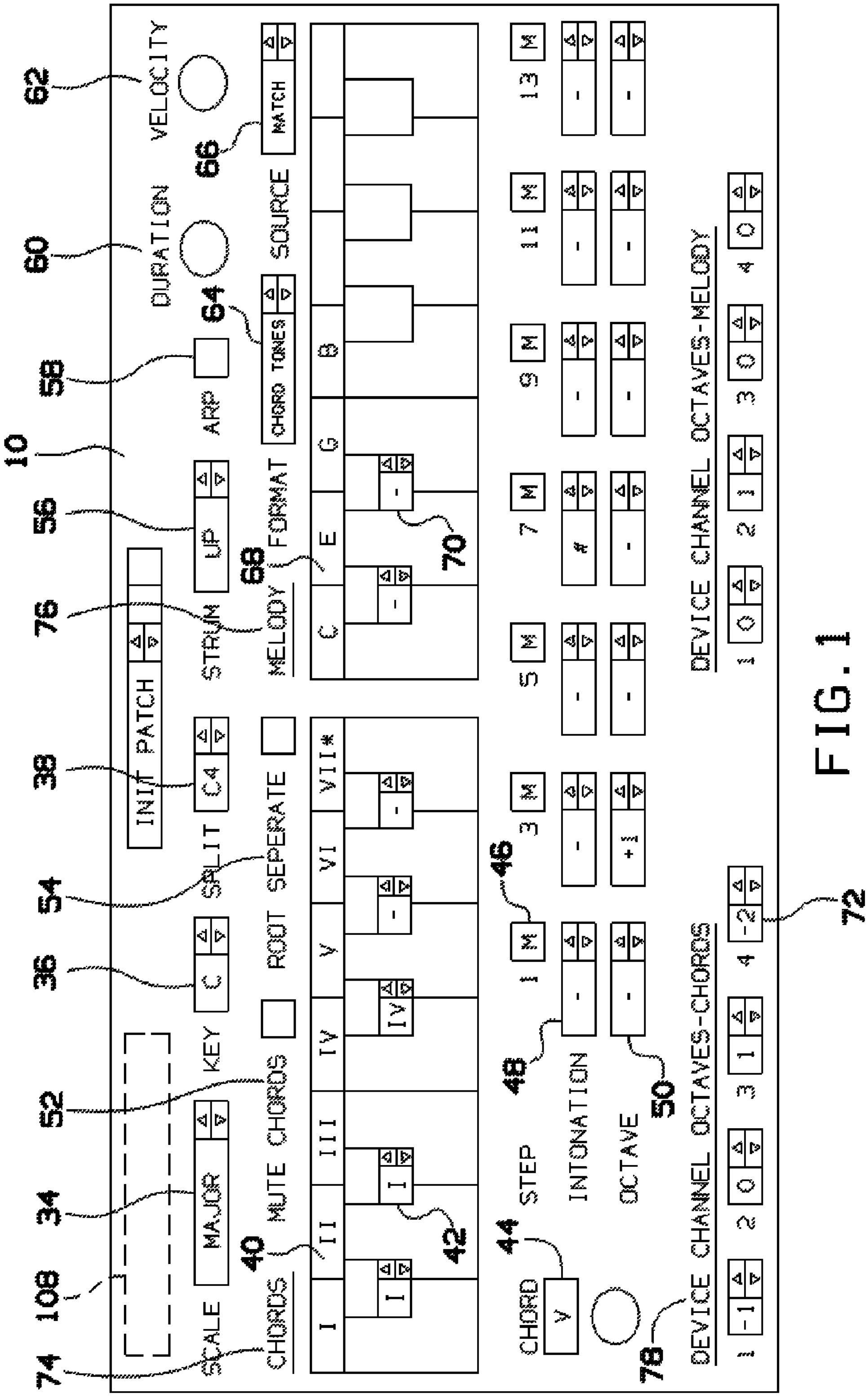
FIG. 1 conceptually illustrates a GUI of a chord creation and melody lock application that locks harmony and melody octaves in perfect pitch in some embodiments.

In the following detailed description, several examples and embodiments of the invention are described. However, it will be clear to a person skilled in the art that the invention is not limited to the embodiments set forth and can be adapted for any of several other uses.

A process and a system are disclosed for some embodiments of the invention that map MIDI signals in a manner which always puts the harmony and melody octaves of an electronic MIDI keyboard in perfect pitch for a user of the keyboard. The process of some embodiments includes (i) receiving a selection of a key signature, (ii) receiving a selection of a scale, (iii) organizing the left side octave(s) ("chord" side) into a chord generator that places all scale tones on white keys and applies a chord effect to each white key, relative to the scale tone position, and (iv) organizing the right side octave(s) ("melody" side) into a melody lock that provides multiple settings for mapping the seven scale tones onto white keys.

In some embodiments, the process is implemented as a chord creation and melody lock computer software application that runs on a computing device. The computing device can be a desktop computer, a laptop computer, a digital audio workstation, a computing device embedded as a hardware component of a stand-alone keyboard, and any of several mobile computing devices, including a tablet computing device, a mobile phone, and a mobile digital media player.

In some embodiments, when a chord is triggered on the left hand octave of the MIDI keyboard, the scale tones align in a manner which places the root tone on the first white key of the right hand octave, with all other scale tones following in the appropriate chord position order. This "locking" occurs by mapping chord tone positions to actual keys. When the user changes to a new chord, the chord tone positions (e.g., 1, 3, 5, 7, etc.) will remain fixed on specific white keys. From the perspective of the electronic keyboard, the keys are the same, but the computer would have re-mapped these keys to play different tones. Specifically, when a MIDI signal from a keyboard is received and the MIDI signal indicates a particular key is pressed, the computer that receives the MIDI signal would look up the key and find the tone mapping associated with the key. By locking the melody to the harmony for any given chord progression, a music producer with no formal training on an instrument can intuitively utilize music theory in a totally open ended manner. In this way, the user can keep their fingers on the same three white keys (chord tone positions) while chords and tones are changing and always play something in perfect pitch.

Any type of MIDI instrument, not only an electronic MIDI keyboard, can be connected to a computer that maps the keys of the electronic keyboard to specific tones that ensure that the melody is in tune with whatever harmonic chord progressions are being utilized by a user.

Several more detailed embodiments are described in the sections below. Section I provides a conceptual description of a chord creation and melody lock process and system for generating chords and locking melody to a chord. Next, Section II describes an electronic system that implements a chord creation and melody lock computer software application.

I. Chord Creation and Melody Locking

In some embodiments, the chord creation and melody lock application operates in conjunction with an audio production software application that runs on the computing device. Examples of audio production software include GarageBand, developed and licensed by Apple Inc., Pro Tools, developed and licensed by Avid, and Reason, developed and licensed by Propellerheads Software. When the audio production software is operating in conjunction with the chord creation and melody lock application, a user is able to simultaneously compose harmonies and melodies in perfect pitch. This allows a music producer to seamlessly compose music productions in an intuitive manner and in as open ended of an environment as the producer wishes to play in.

The MIDI keyboard generates MIDI signals that are transmitted to the computing device in some embodiment. Thus, the MIDI keyboard is an input device associated with the audio production application, such that the audio production application receives signals from the MIDI keyboard that determine logical selections of keys and notes during operation of the audio production application. The chord creation and melody lock application, on the other hand, maps tones of keys on the MIDI keyboard. Thus, the keyboard controls many aspects of operating the audio production program, while the chord creation and melody lock program control much of the output that the MIDI keyboard outputs to the audio production program.

FIG. 1 conceptually illustrates a graphical user interface (GUI) 10 of a chord creation and melody lock program that locks melody octaves in perfect pitch with harmony octaves in some embodiments. As shown, the chord creation and melody lock GUI 10 comprises a plurality of chord generation and melody locking GUI tools. These GUI tools comprise a scale selection tool 34, a key selection tool 36, a split location selection tool 38, a chord display area 40, a set of chord selection tools 42, a chord selection tool 44, a mute chords button 46, a set of intonation selection tools 48, a set of octave selection tools 50, a mute chords indicator field 52, a root separate field 54, a strum selection tool 56, an arpeggiation (ARP) indicator field 58, a duration selection wheel 60, a velocity selection wheel 62, a format selection tool 64, a source selection tool 66, a note display area 68, a set of melody selection tools 70, a tool for selecting fourth output channel 72, a chord generator area 74, a melody lock area 76, a set of tools for selecting output channels 78, and a logo display area 108.

The operation of the GUI shown in FIG. 1 is described by reference to FIG. 2, which conceptually illustrates an example process in some embodiments for using the chord creation and melody lock application to map MIDI signals in a manner which puts the harmony and melody octaves of an electronic MIDI keyboard in perfect pitch for a user of the keyboard.

In some embodiments, the process receives selections (at 80) for each of a scale, a key, and a split. The split refers to the location on the MIDI keyboard where the Chord Generator (left side octaves) and Melody Lock (right side octaves) functions will be divided from each other. The process next transmits the scale, key, and split selections to the chord generator (at 82). These values place all scale tones within the Chord Generator onto white keys, with the selected key signature being transposed to the left most white key and all other scale tones following in a corresponding order (except for when the Melody Lock is set to Absolute Scale, as described below). The first white key will be representative of the I chord, the second white key representative of the II chord, up to the seventh white key which will represent the VII chord. When one of these white keys on the Chord side octave is selected, the entire chord will be applied with the characteristics designated by the Chord Generator settings.

Intonation and voicing selections are also transmitted to the chord generator. The intonation and voicing controls define the characteristics of each chord by allowing the user to add or remove any scale tone to create extended chords, adjust the voicing of any scale tone either up or down an octave, or to apply a sharp, flat or double flat to each individual scale tone within the chord. The process can also receive a selection (at 84) of a strum/arpeggiation. The process can then receive a selection of mute chords (at 86) to apply a chord but mute the audible tones. The process can also receive a selection of root separate (at 88). The process then receives a selection of potential output channels (at 90) and channel octaves (at 92). In some embodiments, the mute chords, the strum/arpeggiation, and the root separate are optional settings for the user to select. Further optional selections may be received but are not required.

Alongside of the scale, key, split and Chord Generator selections, the Melody Lock function allows users to select one of four mapping settings (at 94): Chord Tones, Dynamic Scale, Relative Scale and Absolute Scale. The Chord Tones setting takes the values defined by the scale, key and split selections (at 96) and combines them with the Chord Generator data that is transmitted (at 98). The resulting mapping places all scale tones on the white keys, with the root note of the chord transposed to the first white key, the second chord tone ($3^{rd}$ scale tone) on the second white key, the third chord tone ($5^{th}$ scale tone) on the third white key, the fourth chord tone ($7^{th}$ scale tone) on the fourth white key, the fifth chord tone ($2^{nd}$ scale tone) on the fifth key, the sixth chord tone ($4^{th}$ scale tone) on the sixth white key, and the seventh chord tone ($6^{th}$ scale tone) on the seventh white key. Every time a new chord is selected in the Chord Tones setting, the tone values associated with the white keys change.

The Dynamic Scale setting takes the values defined by the scale, key and split selections (at 96) and combines them with the Chord Generator data that is transmitted (at 98). The resulting mapping places all scale tones on the white keys, with the root note of the chord transposed to the first white key with all other scale tones following in a conventional order. For example, when a V chord is played in Dynamic Scale, the scale tone ordering would be 5, 6, 7, 1, 2, 3, 4. Every time a new chord is selected in the Dynamic Scale setting, the tone values associated with the white keys change.

Both the Chord Tones and Dynamic Scale settings route directly to a source setting (at 100) which determines whether Melody Lock is controlled by the last chord played from the chord generator, or by predetermined values. Inversions (at 102) can be applied to both the Chord Tones and Dynamic Scale settings before they are transmitted through multiple output channels (at 104) where octave values can be assigned (at 106).

The Relative Scale setting takes the values defined by the scale, key and split selections (at 96) and places the corresponding scale tones on all of the white keys. The selected key signature setting will be transposed to the first white key with all other scale tones following in a corresponding order. When the Relative Scale setting is selected, tone values associated with white keys will not change when a new chord is selected from the Chord Generator.

The Absolute Scale setting takes the values defined by the scale, key and split selections (at 96) and places the corresponding scale tones on all of the white keys. The selected "key" will not be transposed to the first white key. All scale tones will be located on the white key that corresponds to their natural position. This is a result of a convention that any scale has a native positioning of tones on keys which is often considered a natural position. The native positioning of scale tones is akin to a default positioning of the tones that exists before any scale tones are transposed from native white key positions to other white keys. Thus, when Absolute Scale is selected, the Chord Generator maintains the native positioning of all scale tones (i.e., keeps all scale tones on their natural white key positions). Accordingly, tone values of white keys do not change in response to new chord selections of the Chord Generator when the Absolute Scale setting is selected.

Both the Relative Scale and Absolute Scale settings will route directly to multiple output channels (at 104), where octave values can be assigned (at 106) to each channel.

Thus, when the chord creation and melody lock application are used together with an audio production application and a MIDI keyboard instrument, the user is presented with many options for easily organizing the melody tones found within selected chords. In the most basic settings the right side melody octave of the keyboard locks into the notes that are present in the chord being played by the left hand, enabling a person using the keyboard to keep their fingers in the same positions and never play out of key.

Figure 3:
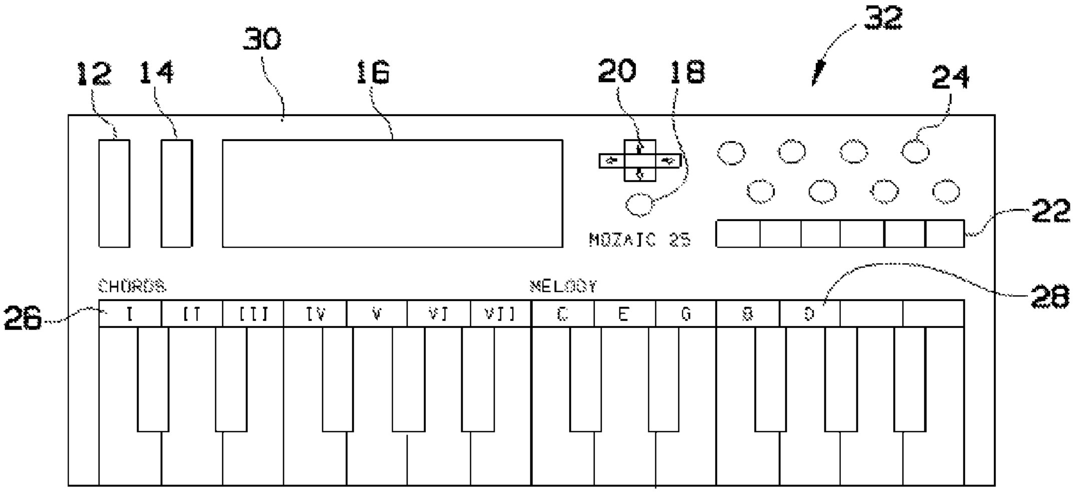
FIG. 3 conceptually illustrates a schematic diagram of an example electronic MIDI keyboard with an internal chord creation and melody lock process, displaying harmony and melody octaves locked in perfect tune.

FIG. 3 conceptually illustrates a schematic diagram of an example electronic MIDI keyboard 32 which can interface with the chord creation and melody lock application to lock the harmony and melody octaves in perfect tune. As shown, the MIDI keyboard 32 has a keyboard layout 30 comprising a pitch blend tool 12, a mod wheel 14, a display screen 16, a value knob 18, a navigation selection tool 20, a set of transport selection buttons 22, a set of control knobs 24, an LCD chord display area 26, and an LCD note display area 28.

The computing device of some embodiments is part of a system for mapping MIDI signals in a manner which always puts the harmony and melody octaves of the electronic MIDI keyboard in perfect pitch. In addition to the computing device, the system of some embodiments includes an electronic MIDI keyboard communicably connected to the computing device by a data transmission channel that supports MIDI-based data transmissions to and from the MIDI keyboard. The data transmission channel can be a universal serial bus (USB) cable connected to a USB port on the MIDI keyboard and a USB port on the computing device, a set of MIDI cables connected to MIDI ports on the MIDI keyboard and MIDI ports on the computing device, or a wireless data connection between a wireless receiver of the MIDI keyboard and a wireless receiver of the computing device.

After a user is able to set up a system, the user can easily compose expert level chord progressions and melodies by holding down one key at a time in each octave. Every possible white key will be locked into a perfect pitch for the given chord, so it is impossible to play anything out of tune. Moreover, the user will have the choice of adjusting multiple settings including, Key Signature, Scale, Strum functions, Mute chord, inversions, Read MIDI chord data, Chord type, Voicing, and the Octave for every output channel.

Although the process and system described above pertain to open ended production by untrained music producers, it is conceived that improvements could come with presets for the device which provide the musical forms of classic songs (key, scale, chord, voicing, etc.). Furthermore, the functions of the software described in this specification are compatible with any type of electronic MIDI music instrument that arranges the harmony and melody octaves to have the same ordering. In addition, although the example application described by reference to FIGS. 1-3 pertains to a computing device, such as a desktop computer or audio workstation, it is conceived that all the functions of the software can be fully embedded into any type of electronic MIDI music instrument that arranges the harmony and melody octaves to have the same ordering., and thereby obviates the need to use the software.

II. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
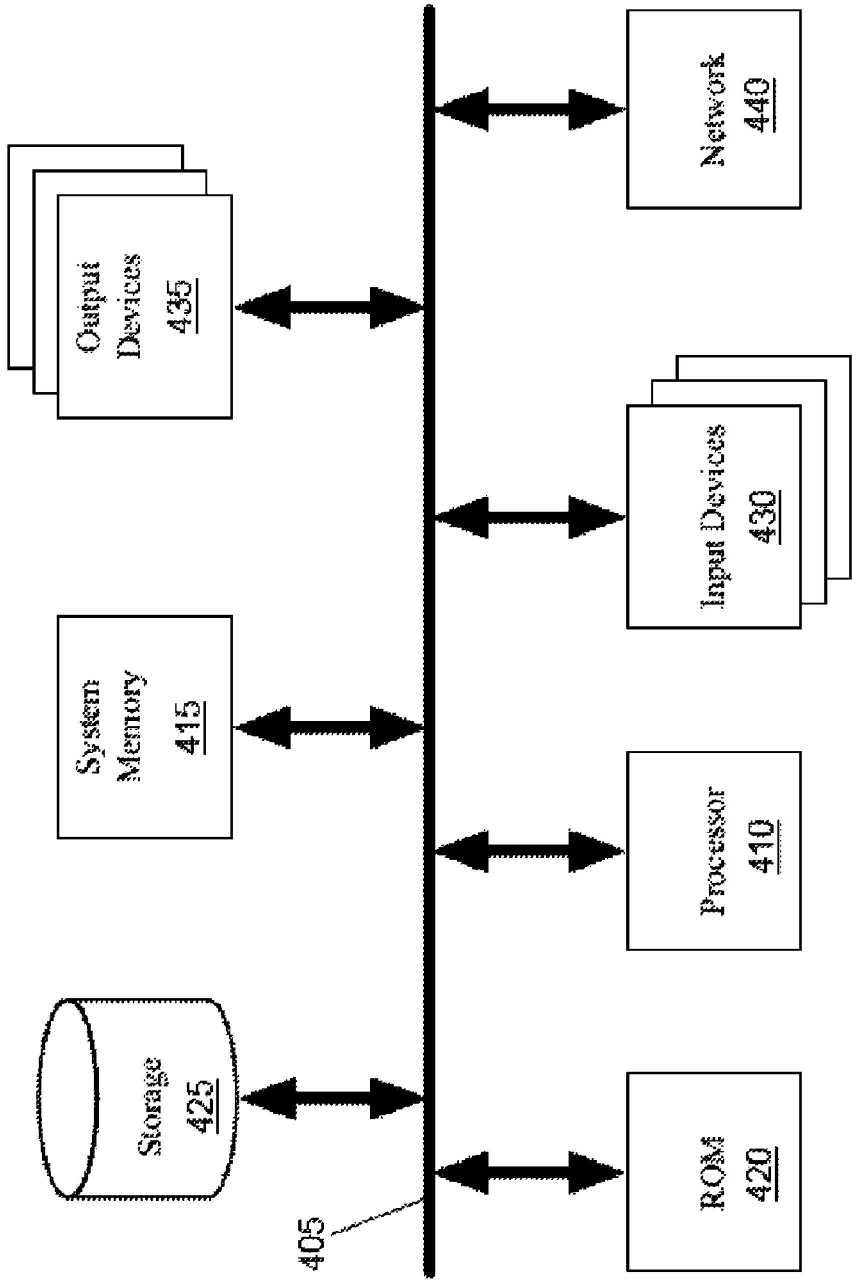
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing multimedia items in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), an Intranet, or a network of networks, such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows may be performed by one or more programmable processors and by one or more programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the figures illustrate conventional piano style MIDI keyboards. However, other MIDI instruments could be used. Thus, one of ordinary skill in the art would understand that the invention is not to be limited by the foregoing illustrative details, but rather is to be defined by the appended claims. Additionally, MIDI is only one kind of communication protocol that is commonly used for digital musical instruments. However, other digital music communication protocols apply to this specification as a person skilled in the art would understand.

Also, a number of the Figures (including FIG. 1 and FIG. 3) illustrate example user interfaces and schematics. The specific tools associated with these user interfaces may not be displayed with exactly the same graphical layouts or appearances of the example user interfaces. Specific elements of these user interfaces may not be displayed in the exact positions shown and described. The display of specific elements shown in each example user interface may be disbursed over several distinct user interfaces and some of the specific elements shown in a single example user interface may be displayed on other associated user interfaces.

Figure 2:
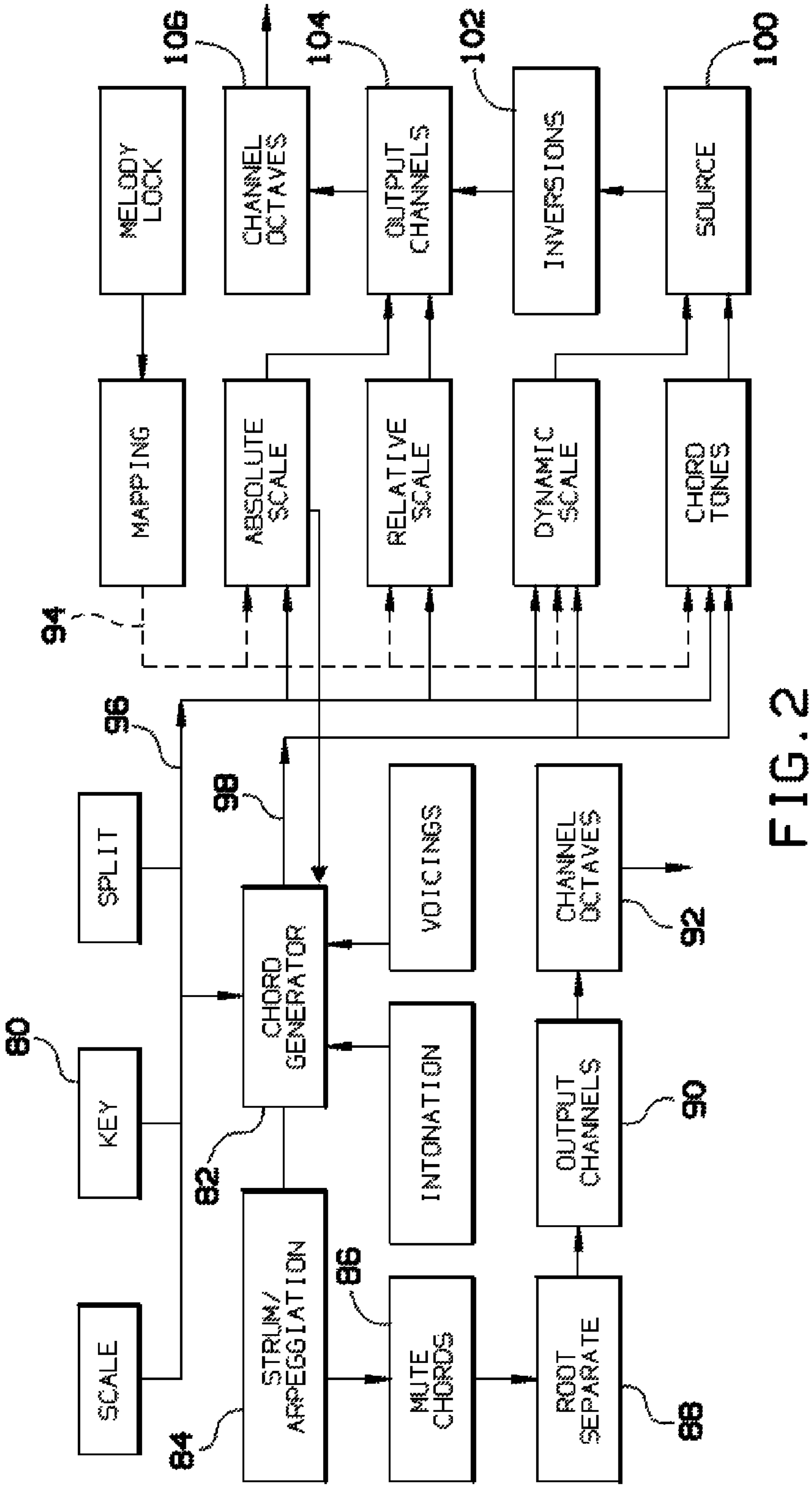
FIG. 2 conceptually illustrates an example process in some embodiments for using a chord creation and melody lock application to map MIDI signals in order to lock the harmony and melody octaves of an electronic MIDI keyboard in perfect pitch.

In addition, FIG. 2 conceptually illustrates a process. The specific operations of this process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which when executed on a processor of a computing device maps a plurality of electronic MIDI keyboard keys in accordance with a plurality of chords, each chord comprising a plurality of audible tones, said program comprising sets of instructions for:

receiving a selection of a key signature;

receiving a selection of a scale comprising a set of scale tones;

assigning all scale tones on white keys of a chord side octave by applying to each chord side white key a chord comprising a plurality of audible tones, wherein the audible tones of each chord are applied relative to the scale tone position of the chord side white key; and mapping a set of scale tones to white keys of a melody side octave based on the scale tones of the chord side octave, wherein the set of scale tones are mapped according to a particular setting from a plurality of settings for mapping the set of scale tones onto the melody side white keys.

2. The non-transitory computer readable medium of claim 1, wherein the set of instructions for mapping the set of melody side scale tones comprises a set of instructions for re-positioning the scale tones from a set of native key positions to a set of white key positions adjacent to the native key positions.

3. The non-transitory computer readable medium of claim 1, wherein the set of instructions for mapping the set of melody side scale tones comprises a set of instructions for transposing all scale tones along the white keys to position the key signature on the first white key.

4. The non-transitory computer readable medium of claim 1, wherein the plurality of tones of the chord comprises a root note, wherein the set of instructions for mapping the set of melody side scale tones comprises a set of instructions for transposing, after a chord from the chord side has been played, all scale tones along the white keys to position the root of the last chord played from the chord side on the first white key.

5. The non-transitory computer readable medium of claim 1, wherein the set of instructions for mapping the set of melody side scale tones comprises a set of instructions for arranging, after a chord has been played from the chord side, scale tones in the chord tone ordering of the last chord played from the chord side.

6. The non-transitory computer readable medium of claim 1, wherein the set of instructions for assigning comprises a set of instructions for selecting the plurality of audible tones for each chord from a set of seven scale tones, wherein scale tones are selected for each chord before applying the chord to the chord side white key.

7. The non-transitory computer readable medium of claim 6, wherein the set of instructions for assigning further comprises a set of instructions for adjusting the intonation of each selected scale tone to one of a sharp, a flat, and a double flat, wherein the intonation of each scale tone in each chord is adjusted before applying the chord to the chord side white key.

8. The non-transitory computer readable medium of claim 6, wherein the set of instructions for assigning further comprises a set of instructions for adjusting the relative octave positioning of each selected scale tone, wherein the relative octave positioning of each scale tone in each chord is adjusted before applying the chord to the chord side white key.

9. The non-transitory computer readable medium of claim 1 further comprising a set of instructions for logically splitting the MIDI keyboard at a particular location that separates a set of chord octaves from a set of melody side octaves.

10. The non-transitory computer readable medium of claim 1 further comprising a set of instructions for receiving a set of output channels to output the mapped notes to the MIDI keyboard.

* * * * *